Nov. 12, 1968  W. SKIRVIN ET AL  3,410,259
BRICK CLEANING DEVICE
Filed Sept. 14, 1965  3 Sheets-Sheet 1
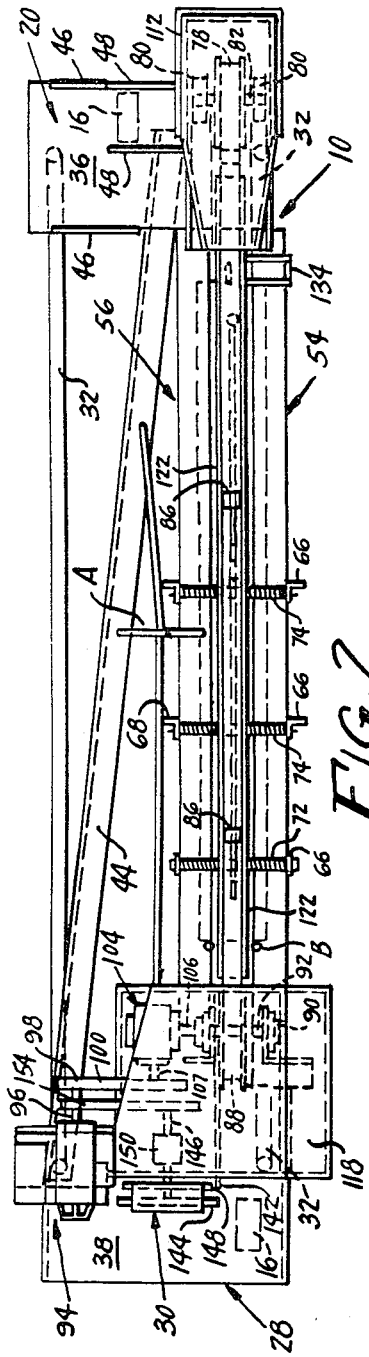
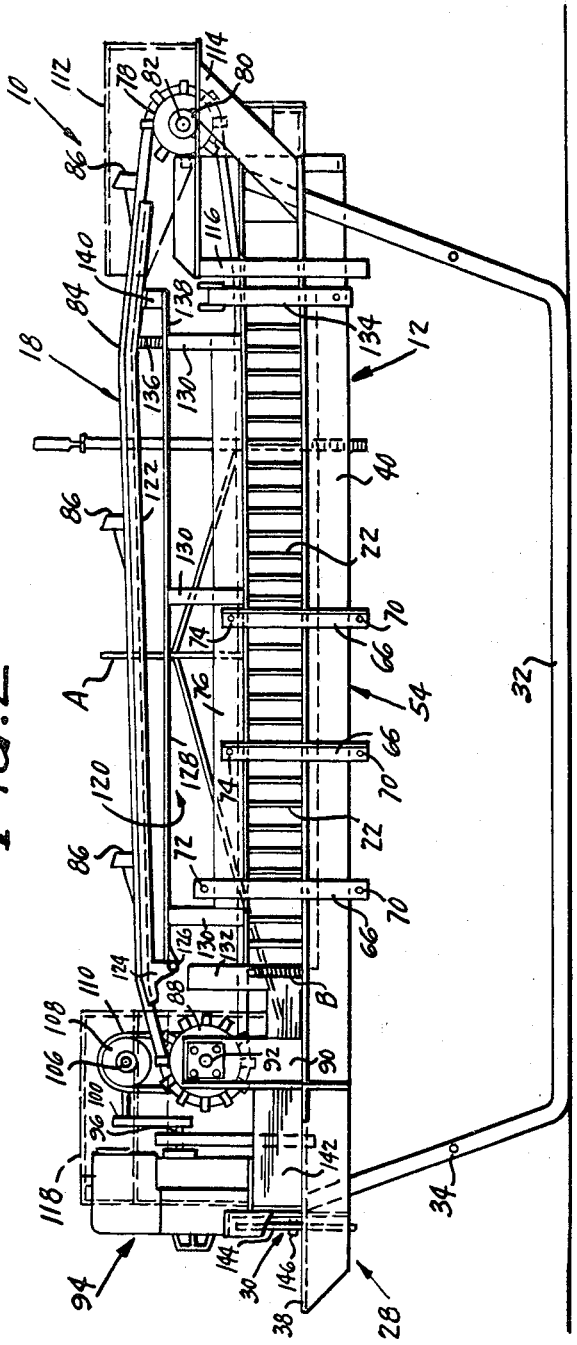
INVENTORS.
ENOCH SKIRVIN
WALTER SKIRVIN
PAUL SKIRVIN
BY Kimmel, Crowell & Weaver
ATTORNEYS.

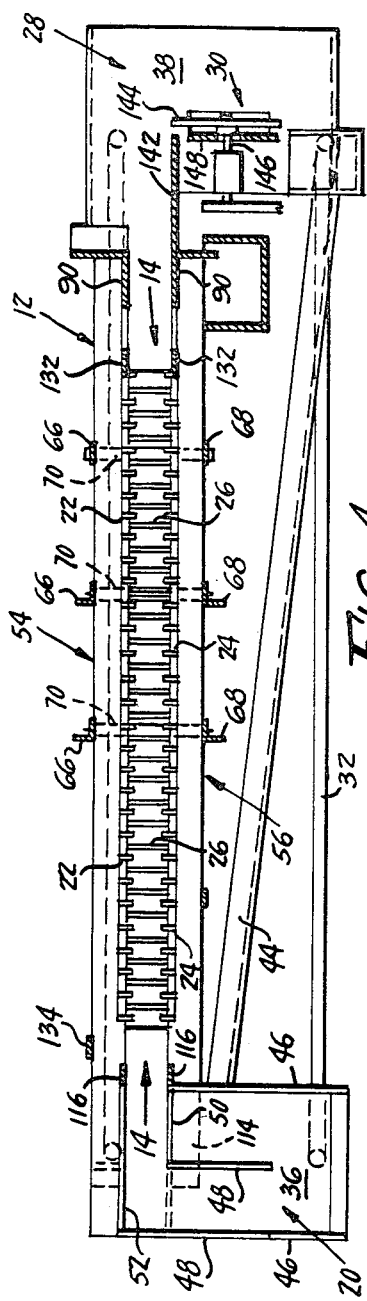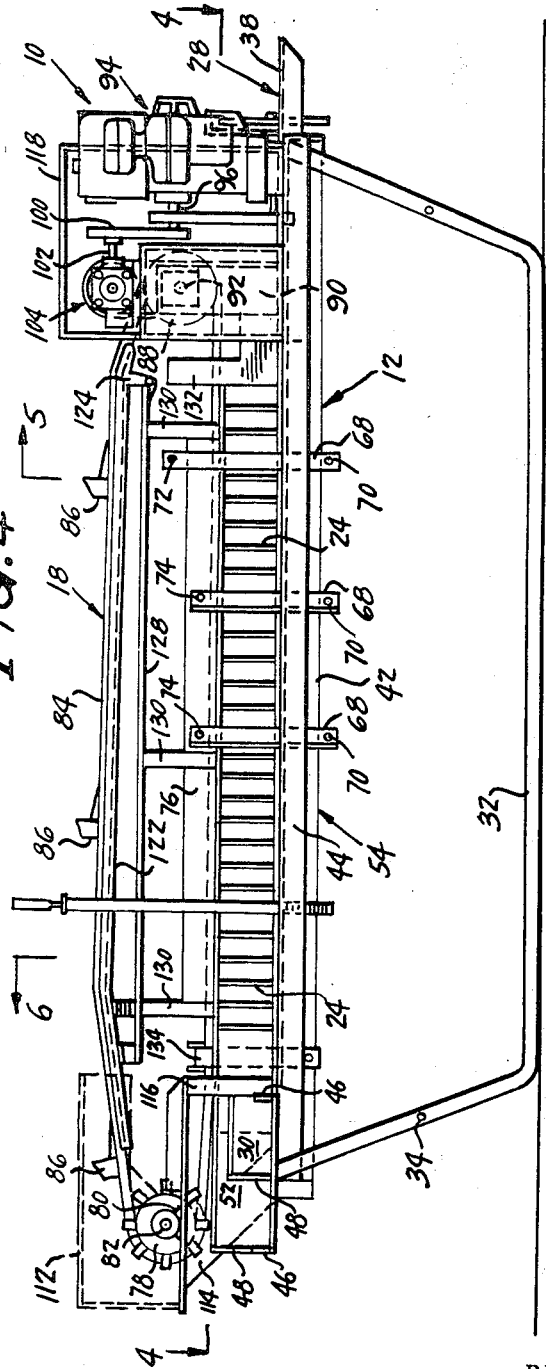

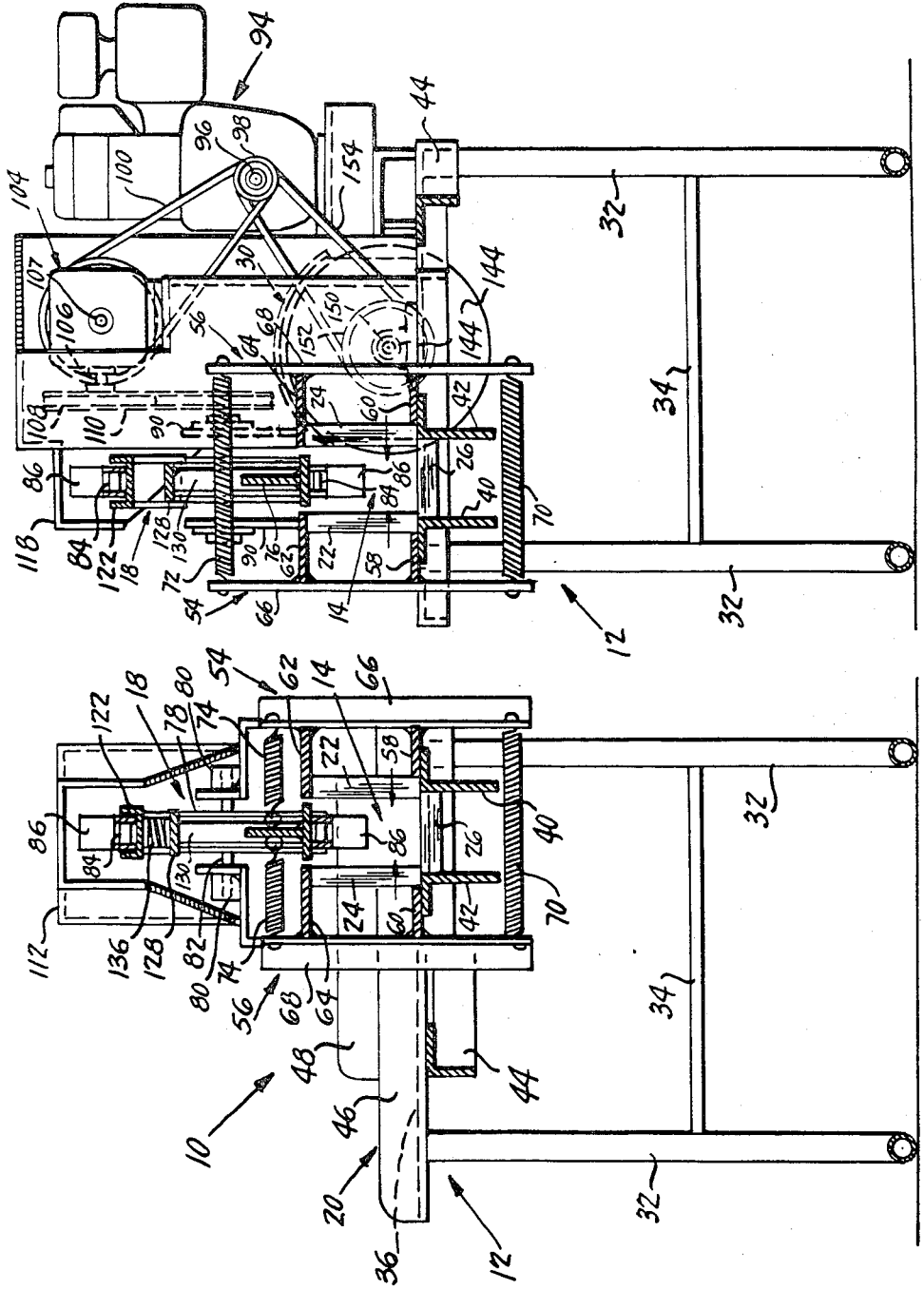

3,410,259
BRICK CLEANING DEVICE
Walter Skirvin, Paul Skirvin, and Enoch Skirvin, all of Rte. 2, Box 1–M, Philomath, Oreg. 97370
Filed Sept. 14, 1965, Ser. No. 487,284
2 Claims. (Cl. 125—26)

ABSTRACT OF THE DISCLOSURE

Apparatus including an elongated frame having an elongated raceway thereon defined by a plurality of horizontal scrapers disposed in laterally spaced relation relative to one another longitudinally of the frame and upright scrapers slidably mounted on opposed sides of the frame in confronting relation relative to one another, the pairs of confronting scraper blades being mounted on the frame in longitudinally spaced relation relative thereto; tension means connected with and extending between each pair of confronting blades to constantly bias these blades for movement towards one another; and conveyor means extending into the raceway and engagable with brick to be scraped to push the brick from one end of the frame through the raceway over the horizontal scrapers and between the upright scraper blades for discharge at the other end of the frame.

---

This invention relates to a device for cleaning old bricks which are mortar encrusted and more particularly to a device for scraping only selected faces of old bricks.

Brick cleaning machines are known generally in the prior art, one of the types known comprising a series of sets of opposed scraping blades sequentially scraping the side walls, the top and bottom walls, and the end walls of an old brick. A number of disadvantages attend these prior art devices, one of them being that the brick end walls can be scraped only after rotating the brick 90° along the direction of travel or by turning the direction of travel 90°. Devices which rotate the brick 90° along the direction of travel are complex and inefficient, often failing to properly position the brick. Similar difficulties attend brick cleaning devices which turn the direction of brick travel 90°.

Another disadvantage of the prior art devices of the type described is that a number of sets of scraping edges must be provided in order to scrape the sidewalls and the top and bottom walls. This leads to an unnecessarily large device and expends unneeded effort in scraping all of the faces of an old brick. It has been found that the end walls of a brick may be best cleaned by an abrasive wheel or the like with only the top, bottom and one side wall of the remaining walls requiring cleaning. It will be recognized that the side faces of a brick normally do not come in contact with a mortar layer and thus are free from encrusted material. Accordingly, they would not ordinarily need scraping or cleaning. It has been found advantageous, however, to clean one of the side faces such that the builder may have the option of building walls having clean side faces or aged side faces, the unchosen face being hidden by the building structure.

An object of the instant invention is to provide a brick cleaning device for cleaning the top, bottom and one side wall of an aged mortar encrusted brick.

Another object of the instant invention is to provide a brick cleaning device of the character described utilizing an abrasive wheel for cleaning the end walls of an old brick.

Still another object of the instant invention is to provide a brick cleaning device utilizing three scraper frames positioned in a U-shaped configuration with an endless conveyor extending into the open end of the U-shaped scraper for propelling a series of bricks along the raceway.

A further object of the instant invention is to provide a device for cleaning old bricks utilizing two parallel spaced apart scraper frames biased toward each other for insuring the removal of mortar on bricks passed through.

A still further object of the instant invention is to provide a brick cleaning device which is simple in construction and operation, which may be inexpensively manufactured and maintained and which has a high throughput capacity.

Another object of the instant invention is to provide a skid mounted brick cleaning device which may be readily loaded on a flatbed truck for movement from location to location.

Other objects and advantages of the instant invention reside in the combinations of elements, arrangements of parts, and features of construction and operation, all as will be more fully explained hereinafter and disclosed in the accompanying drawings wherein there is shown a preferred embodiment of this inventive concept.

In the drawings:

FIGURE 1 is a side elevational view of the brick cleaning device of the instant invention showing the inlet end on the right hand side and the outlet end on the left;

FIGURE 2 is a top plan view of the brick cleaning device of FIGURE 1;

FIGURE 3 is a back view of the brick cleaning device of the instant invention showing the inlet end on the left hand side and the outlet end on the right;

FIGURE 4 is a longitudinal cross-sectional view of the brick cleaning apparatus of FIGURE 3 taken substantially along line 4—4 thereof and viewing in the direction of the arrows;

FIGURE 5 is a transverse cross-sectional view taken along line 5—5 of FIGURE 3; and FIGURE 6 is a transverse cross-sectional view of FIGURE 3 taken substantially along line 6—6 thereof in the viewing in the direction of the arrows.

Referring now to the drawings in detail, wherein like reference characters designate like elements throughout the several views thereof, there is indicated generally at 10 a brick cleaning device having as its major components a frame shown generally at 12 forming a raceway illustrated generally at 14 in FIGURES 5 and 6, through which a series of bricks 16 are propelled by a conveyor means designated generally at 18. As will be explained more fully hereinafter, bricks 16 will be fed into raceway 14 from an input station shown generally at 20, engaged by conveyor 18 and propelled past a plurality of scraper blades 22, 24, 26 coming to rest at an output station shown generally at 28 adjacent which is provided an abrasive wheel shown generally at 30 for cleaning previously uncleaned faces and polishing previously cleaned faces.

Frame 12 includes a pair of parallel skid runners 32 interconnected by a cross brace 34 supporting a pair of planar working surfaces 36, 38 at each end of frame 12. Connecting working surfaces 36, 38 are a pair of parallel angle iron beams 40, 42 to which are secured horizontal scraping blades 26 as may be seen in FIGURES 5 and 6. A diagonal angle iron support 44 connects working surfaces 36, 38 providing structural rigidity.

As may be seen in FIGURES 2, 3, 4 and 6, input station 20 includes a planar working surface 36 which is provided with a pair of lateral upstanding flanges 46 for retaining bricks 16 on working surface 36. A pair of taller vertical divider walls 48 divide working surface 36 into two sections each of which is approximately one brick wide, one of divider walls 48 overlying leftmost upstanding flange 46 as may be seen in FIGURES 3 and 4. A vertical longitudinal wall 50 connects rightmost flange 46 and central divider wall 50 with a second vertical longitudinal wall 52 secured to leftmost divider wall 58 and cooperating with wall 50 to provide an inlet end for raceway 14 as may be seen in FIGURE 4.

Movably mounted on frame 12 parallel to angle iron beams 40, 42 are a pair of scraper frames shown generally at 54, 56 including a pair of first horizontaly coplanar bars 58, 60 slidably received on angle iron members 40, 42 and fixedly secured to the lower ends of blades 22, 24 as may be seen in FIGURES 5 and 6. A pair of second horizontal coplanar bars 62, 64 are connected to the upper ends of scraper blades 22, 24 with a series of vertical elongated interconnecting supports 66, 68 securing the first and second horizontal bars 58, 62 and 60, 64 together.

A spring 70 interconnects the lower ends of vertical supports 66, 68 and urges the lower ends thereof together. Rightmost vertical supports 66, 68 of FIGURE 3 are interconnected by a tension spring 72 identical with spring 70 for urging frames 54, 56 toward each other while the remainder of vertical supports 66, 68 are equipped with a pair of springs 74 connected to an inverted T element 76 for similar purposes. As more fully explained hereinafter, bricks 16 will be propelled down raceway 14 such that blades 22, 24 scrape encrusted mortar from the top and bottom surfaces of bricks 16 with springs 70, 72, 74 urging scraper frames 54, 56 together to insure complete cleaning of these surfaces.

One side of brick 16 will be in contact with scraper blades 26 and will also be cleaned by the movement through raceway 14 with weight being applied from above to insure an adequate scraping. Partially cleaned brick 16 will be propelled out of raceway 14 onto working surface 38 of output station 28 by subsequent cleaned bricks moved by conveyor 18. An operator positioned at output station 28 will grasp each of partially cleaned bricks 16 and clean the end surfaces thereof utilizing abrasion wheel 30 as is more fully explained hereinafter.

Conveyor 18 includes a driven sprocket 78 mounted on frame 12 by a pair of upstanding supports 80. An endless conveyor belt or chain 84 provides a plurality of pusher plates 86 extending into raceway 14 to engage bricks 16 as may be seen in FIGURES 5 and 6. A driving sprocket 88 is mounted by a pair of upstanding supports 90 rotatably receiving an axle 92 receiving endless conveyor chain 84 in a conventional manner.

Conveyor means 18 is driven by an internal combustion engine shown generally at 94 secured to frame 12 adjacent output station 28 having a drive shaft 96 carrying a pulley 98 to which a driving belt 100 is secured. Belt 100 is operatively engaged with an input shaft 102 of a geared transmission shown generally at 104. Transmission 104 includes an output shaft 106 carrying a pulley 108 receiving an endless belt 110 driving axle 92 to which sprocket 88 is fixedly secured in a known manner.

For purposes of safety, a hood 112 is positioned over sprocket 78 and the inlet end of raceway 14 and is secured to frame 12 by a diagonal brace 114 and a pair of vertical braces 116. Likewise a hood 118 is located over driven sprocket 88 and geared transmission 104 to avoid the inadvertent injury to an attendant.

A conveyor guide shown generally at 120 is positioned between the upper and lower races of endless conveyor chain 84 and includes an inverted U-shaped channel member 122 receiving conveyor chain 84. Channel member 122 carries a depending arm 124 connected by a pivot pin 126 to a supporting plate 128. Plate 128 is fixedly secured to a series of vertical support posts 130 fixedly secured to inverted T element 76 as by welding or the like. The horizontal portion of inverted T element 76 extends longitudinally from support posts 130 and is secured to a pair of vertical plates 132 adjacent the outlet end of raceway 14. At the inlet end of raceway 14 the horizontal portion of inverted T element 76 is secured to an angled pillar 134. Connecting supporting plate 128 and channel member 122 together adjacent the inlet end of raceway 14 is a compressed spring 136 providing a certain amount of resilience for channel member 122 and provides a tensioning means for endless chain 84. If it is found that spring 136 is insufficiently strong to tension chain 84 in the desired manner, an additional tensioning means is provided which includes a downwardly extending end portion of channel 122 overlying a longitudinally adjustable arm 138 carrying a cam 140. If it is found that chain 84 requires tightening beyond the capabilities of spring 136, arm 138 may be longitudinally reciprocated and held in position by any suitable mechanism such that cam 140 contacts the lower surface of the downwardly extending end of channel member 122 to pivot channel 122 about pivot pin 126 thereby tightening chain 84.

In the operation of brick cleaning device 10, mortar encrusted bricks 16 are inserted into race way 14 through the channel formed by divider walls 48 as may be seen in FIGURES 2 to 4 inclusive. Pusher plates 86 will be forcibly driven by conveyor chain 84, sprocket 88 and engine 94 such that the leading edge thereof will contact each brick inserted through the channel formed by divider walls 48. Bricks inserted through divider walls 48 should be positioned by an attendant such that the top and bottom walls, which are normally mortar encrusted to a greater extent, are vertical to insure their contact with vertical scraper blades 22, 24.

As each brick is propelled through raceway 14, scraper blades 22, 24 will scrape the top and bottom walls clean with springs 70, 72, 74 urging scraper frames 54, 56 toward each other to insure complete scraping. It should be noted that springs 70, 72, 74 are positioned closer to the outlet end of raceway 14 since it has been found that a gradually increasing spring biasing force is more efficient in the cleaning of coated bricks.

Soon after each partially cleaned brick is released by pusher plate 86, it will be contacted by a subsequent brick that is just being released by pusher plate 86 such that a procession of closely spaced bricks emits from the outlet end of raceway 14. As may be clearly seen in FIGURE 4, a vertical plate 142 is provided coextensive with one wall of raceway 14 such that the procession of bricks is guided away from contact with the driving mechanisms at output station 28.

Abrasive wheel 30 is located at output station 28 and includes a substantially circular abrading wheel 144 fixedly secured to a shaft 146 rotatably mounted in a journal 148. Another journal 150 supports shaft 146 which is connected to a pulley 152. Pulley 152 is drivingly connected to output shaft 96 of engine 94 by an endless belt 154 mounted upon a pulley fixed to shaft 96.

As each of partially cleaned bricks 16 emerges from raceway 14, an attendant positioned at output station 28 may grasp the same and clean the end edges thereof by contacting them with rotating abrasive wheel 144. In addition, one of the previously cleaned surfaces may be polished using wheel 144. It will be seen that two attendants are necessary to opperate brick cleaning device 10, one of them performing the cleaning operations at output station 28 with the other feeding uncleaned bricks 16 into raceway 14 at input station 20. It has been found that about 20 bricks per minute may be cleaned by two operators utilizing the brick cleaning machine of the instant invention, which, as previously mentioned, may be moved from one source of old bricks to another if desired.

It is now seen that there is herein provided an improved brick cleaning device having all of the objects of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

We claim:

1. A device for cleaning mortar encrusted bricks comprising an elongated normally horizontal frame having brick input and output stations at, respectively, a pair of opposed ends thereof, a pair of laterally spaced substantantially parallel support members mounted on said frame and extending in the direction of its elongation, a plurality of laterally spaced substantially parallel horizontal scraper blades extending between and having opposed ends fixedly connected to said support members, scraper blade support frame means for each of said support members, said scraper blade support frame means each including an elongated bar slidably mounted on said support members, said bars being coplanar with the bar on each support member being slidably mounted for relative movement towards and away from one another and, consequently, each of said scraper blade support frame means, an upright scraper blade connected on each scraper blade support frame means and including connection with said bar thereof, said upright scraper blades each having lower ends immediately adjacent at least some of said opposed ends of said horizontal scraper blades, said horizontal and upright scraper blades taken together defining an elongated raceway having an open upper end, means constantly biasing the opposed scraper blade support frame means for movement towards one another, an endless conveyor mounted on said frame, said conveyor having a portion thereof extending through said open end of said raceway and in vertically spaced relation relative to said horizontal scraper blades for engaging a series of bricks to move said bricks from said input station to said output station through said raceway and over and between said horizontal and upright scraper blades, and drive means connected with said conveyor means.

2. A device as defined in claim 1 wherein said scraper blade support frame means includes a plurality of upright supports extending transversely of and above and below said horizontal frame, and said biasing means being connected to the remotely disposed ends of said upright supports.

References Cited

UNITED STATES PATENTS

| | | | |
|---|---|---|---|
| 1,082,307 | 12/1913 | Christman | 125—26 |
| 1,563,081 | 11/1925 | Funk | 125—26 |
| 3,292,310 | 12/1966 | Lefevre | 125—26 X |

FOREIGN PATENTS 419,782 10/1925 Germany.

HAROLD D. WHITEHEAD, *Primary Examiner.*